May 2, 1967   A. G. NIJHUIS   3,317,227
BUILDING STRUCTURE
Filed Aug. 23, 1965   2 Sheets-Sheet 1
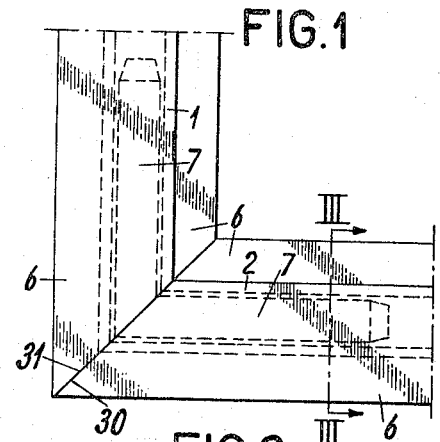
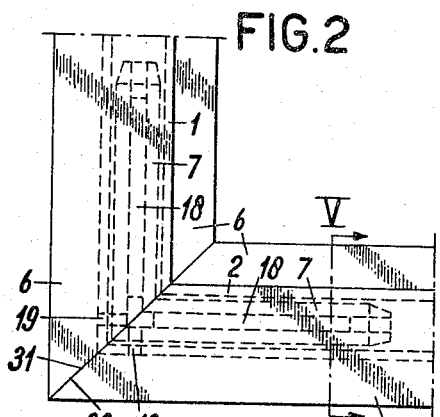
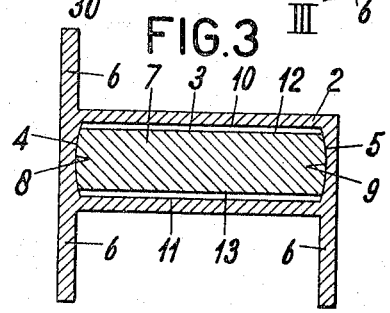
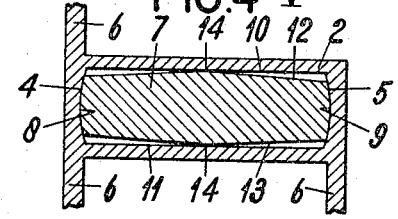
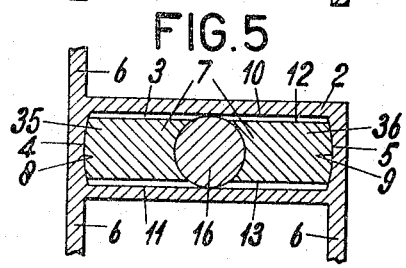
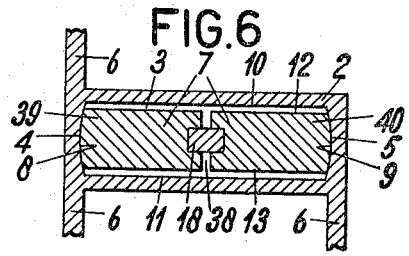
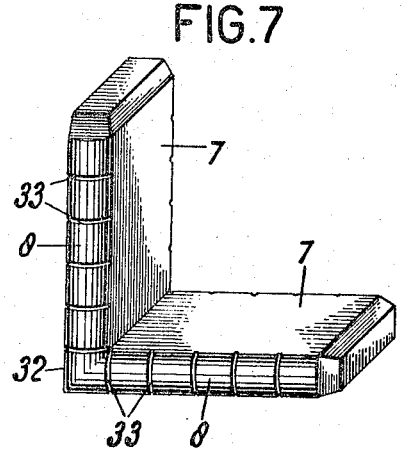
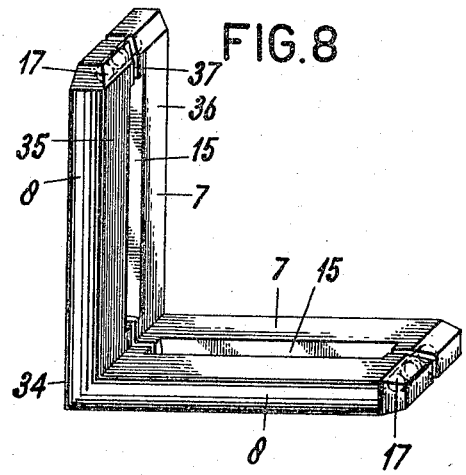

May 2, 1967  A. G. NIJHUIS  3,317,227
BUILDING STRUCTURE
Filed Aug. 23, 1965
2 Sheets-Sheet 2
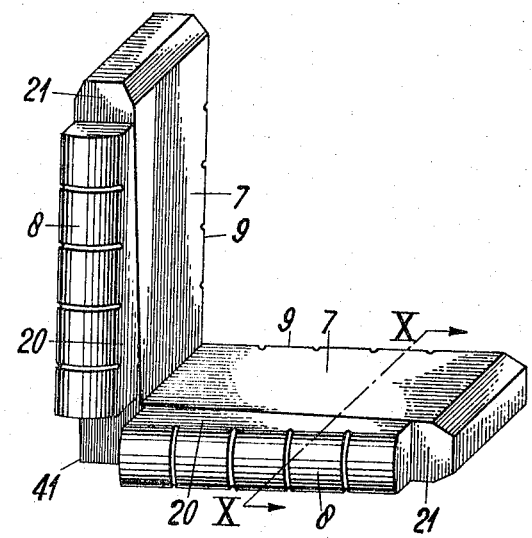
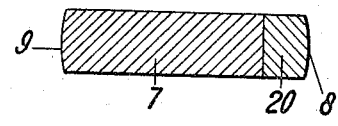
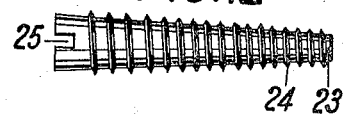
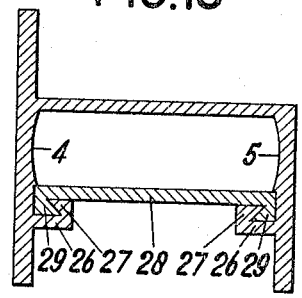
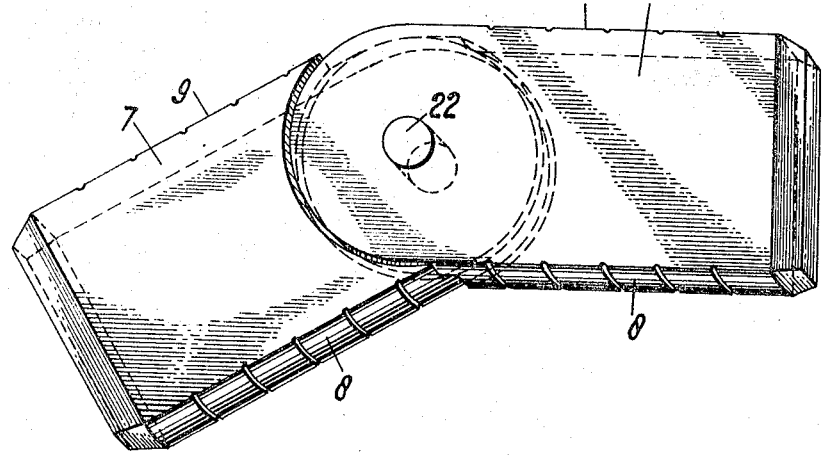

3,317,227
BUILDING STRUCTURE
Aart Gijsbertus Nijhuis, Benedendorpsweg 55,
Oosterbeek, Netherlands
Filed Aug. 23, 1965, Ser. No. 481,722
Claims priority, application Netherlands, Sept. 29, 1964,
6,411,351; Germany, Mar. 31, 1965, N 26,484
15 Claims. (Cl. 287—189.36)

This invention relates to building construction and more particularly to the construction of frames and to a metal or plastic profile piece for use in making frames for windows, doors, partition walls, and so on.

Since frames of this kind are, as a matter of fact, always visible, at least at one side, the means for joining two frame pieces to form a corner with each other should preferably be invisible.

A practical requirement is that the two corners be joined easily and inexpensively. Deformation of the ends of the frame pieces to be connected, the boring of the holes therein, and bolting of corner joint pieces are to be avoided as much as possible because they consume time and money.

A difficulty with the known corner joint means has been that after the pieces have been jointed to form a closed frame, these pieces sometimes appear not to lie in a plane surface; in other words, the closed complete frame appears to be warped. Also, the mitres sometimes do not join smoothly.

The invention offers a practical solution for this problem by providing a profile piece with a special cross section and a corner joint piece which cooperates with this special profile structure.

According to this invention, the profile piece and corner joint piece are characterized by a chiefly rectangular longitudinal aperture in the profile piece, at least at its ends, and by the corner joint piece (which may be of metal or synthetic material like the profile piece) having two legs which may each be jammed into the longitudinal aperture in the profile piece. Also, two opposite surfaces of the longitudinal aperture and the adjacent leg surfaces are segments of the same cylinder. Further, there is enough clearance between the other two surfaces of the longitudinal aperture and the corresponding pair of surfaces of the corner joint piece that the profile member and the leg of the corner joint piece may be slightly rotated with regard to each other, after insertion, the contacting cylindrical surfaces sliding over each other.

The profile piece can still have other edges, e.g. for inserting a pane or panel therein.

Since the cylindrically formed surfaces of the longitudinal aperture in the profile piece and of each leg of the corner joint piece lie firmly against each other, the connection in the direction transverse to these cylindrical surfaces is capable of transfer of large forces. This is, in general, not the case in the direction perpendicular to the other surfaces, for between them there is clearance, as mentioned already. This objection is overcome when, according to this invention, either the non-cylindrical surfaces of the longitudinal aperture in the profile piece, or the non-cylindrical surfaces of a leg of the corner joint piece, or both, have a longitudinal rib extending midway of their width so that the above-mentioned parts engage each other. The imaginary connecting surface of these ribs runs through the center line of the cylinder, on which the cooperating cylindrical surfaces are lying. Since a mutual rotation of a profile piece and a leg of the corner joint piece does not alter the position of the center line, the longitudinal ribs do not prevent this mutual rotation.

Since the cylindrical surfaces of the longitudinal aperture in the profile piece and of the legs of the corner joint piece must closely fit against each other, an exact measured finish would ordinarily be required. However, the necessity for an exact finish is obviated by the present invention, which provides a structure in which the corner joint is split in its longitudinal direction so that it comprises two parts, each having a cylindrical outer surface, plus an elongated piece of elastic material, e.g. rubber, synthetic material or wood or a stiff wedge arranged in the aperture between the two parts. The elastic material acts as a spring compressing the cylindrical surfaces of the corner joint piece uninterruptedly against the cylindrical surfaces of the longitudinal aperture of the profile piece. The piece of elastic material or the wedge may somewhat protrude outside the non-cylindrical surfaces of the corner joint piece, in which case the protruding parts have the same function as the longitudinal ribs on the joint piece already mentioned.

If according to the invention, wedges are positioned between the parts of the legs of the corner joint piece, a hole is preferably made in each of the profile pieces to be jointed, the hole lying in the continuation of the wedge. With the aid of a pin passed through such a hole, the wedge may be driven. The wedges may have longitudinal ribs lying against the non-cylindrical walls of the longitudinal aperture in the profile piece for obtaining a better force transmission, as explained above.

A simpler construction is obtained if, according to the invention, the corner joint piece is split in its longitudinal direction along surfaces making a small angle with the longitudinal direction of the legs and one of the obtained parts is divided into two wedges, each lying against a leg of the undivided piece. These wedges have at one longitudinal side a cylindrical surface as described above and at the opposite longitudinal side a flat wedge surface. The two remaining longitudinal surfaces are parallel. The advantage of this construction is that there are fewer loose parts for a corner joint.

It is also possible to provide the corner joint piece with a hinged construction. Corner joints can be made therewith having an angle desired as to circumstances. For such a case, the ends of the profile pieces to be jointed are each sawn off at an angle equal to one-half of the desired angle.

As the corner joint pieces cooperate only with the ends of two profile pieces to be joined, these profile pieces need be provided only at their ends with the longitudinal apertures, having two cylindrical side surfaces. A shape of profile pieces satisfying this requirement is, according to the invention, obtained when the profile piece has, instead of an aperture running along its entire length as described, two edges with a hook-shaped cross section facing each other, with a short plate over these edges, the plate being also provided with two edges. These hook-shaped edges then cooperate with the hook-shaped edges of the profile piece in such a way that the plate delimits, together with the profile piece, an aperture having two cylindrical surfaces. The hooking connection acts to absorb the tensile force which is exerted on the cylindrical surfaces when the corner piece is put into position.

The invention will now be elucidated by a drawing. In this drawing:

FIG. 1 is a fragmentary view in front elevation of a corner joint between two frame pieces, the connecting pieces being indicated by dotted lines.

FIG. 2 is a similar view of a modified form of the invention.

FIG. 3 is a cross section taken along the line III—III in FIG. 1 and shown on an enlarged scale.

FIG. 4 is a view similar to FIG. 3 of a modified form thereof.

FIG. 5 is a view in section taken along the line V—V in FIG. 2 of a modified form, being shown on an enlarged scale.

FIG. 6 is a view similar to FIG. 5 of another modified form thereof.

FIGS. 7, 8 and 9 are each views in perspective of corner joint members, each of which embodies the principles of this invention, though different from each other.

FIG. 10 is a cross section of the corner joint piece taken along the line X—X in FIG. 9 and seen in the direction of the drawn arrows.

FIG. 11 is a view in perspective of a hingeable corner joint piece of this invention.

FIG. 12 is a view in elevation of a conical pin with a screw thread for pressing apart the parts of a corner joint piece.

FIG. 13 is a view in cross section of a profile piece of another shape also embodying the principles of this invention.

A portion of a frame made by this invention is shown in FIG. 1, where two profile pieces 1 and 2 are joined. The profile piece 1 and 2 may be obtained by extrusion of aluminum, and they may be cut or sawn off obliquely at edges 30, 31 in such a way that they fit at the desired angle, which may be 90° or of another value.

Each profile piece 1 or 2 has, as shown in FIGS. 3, 4, 5, and 6 a generally rectangular longitudinal aperture 3, the short sides 4 and 5 of which are curves comprising segments of the same cylinder. Furthermore each profile piece 1, 2 preferably has such flanges 6, as may be necessary, e.g. for fixing a pane of glass or for fixing a wooden lath. These flanges 6 may have various shapes, according to circumstances, and they may lie in other places of the profile, and the number of flanges may vary.

The longitudinal aperture 3 of each profile piece 1, 2 is used to receive a leg 7 of a corner joint piece. Various types of corner joint pieces are shown in their entirety in FIGS. 7, 8, 9, and 11. The leg 7 of the corner joint piece 32 shown in FIGS. 1, 3 and 7 has a cross section which is chiefly rectangular, but its short sides 8 and 9 are curved along a cylinder of the same size as that of the short sides 4 and 5 of the longitudinal opening 3. Consequently the surfaces 4 and 8 lie against each other, as do the surfaces 5 and 9. However, there is clearance between the long surfaces 10 and 11 of the longitudinal opening in the profile piece 1 or 2 and the long surfaces 12 and 13 of the leg 7 of the corner joint piece 32.

The corner connection is effected by pressing into each of the profile pieces 1 and 2 to be joined a leg 7 of a corner joint piece such as the piece 32. Now the curved surfaces 4 and 8 and also the curved surfaces 5 and 9 come to lie firmly against each other so that the connection is maintained by friction. In case one of the connected profile pieces should not be in the same plane surface as the other, it is possible to correct the misalignment by wrenching one of the profile pieces with regard to the leg 7 of the corner joint piece pressed therein. The clearances between the long surfaces 10 and 12 and between the surfaces 11 and 13 make this possible.

If desired, the cylindrical surfaces 8 and 9 of the corner joint piece may be coated with glue before the leg 7 is pressed in. During the pressing in, the glue acts as a lubricant, and later it helps the pieces to adhere together. For an adequate distribution of the glue transverse grooves 33 may be provided on the cylindrical surfaces, as shown in FIG. 7.

The force-transmitting ability between a profile piece 1 and a leg 7 of the corner joint piece is considerable in the direction parallel to the long surfaces 10, 11, 12, 13 but, in the device of FIGS. 1 and 3, is much smaller in the direction transverse thereto. In order to aid in force-transmission in this transverse direction, each of the long surfaces 12 and 13 and the leg may have midway across their breadth a longitudinal rib 14 (FIG. 14), the ribs 14 lying against the surfaces 10 and 11 of the longitudinal aperture 3 in the profile piece 1 or 2. These ribs 14 may be obtained by bevelling the surfaces 12 and 13 a little as shown in FIG. 4, by which a rib 14 is formed in the middle. It is also possible for the ribs 14 to be formed integrally with the surfaces 10 and 11 of the longitudinal aperture in the profile piece 1 or 2, while the surfaces 12 and 13 of the leg 7 may then be completely flat. Another possibility is to arrange lower ribs on both the leg 7 and the surfaces 10 and 11 of the profile piece, with the ribs lying against each other in pairs. The presence of the ribs 14 according to one of these described constructions does not prevent the correction of misalignment of a frame piece with regard to a leg 7.

In the construction of the profile piece and the corner joint piece special care must be taken with regard to the distance between the pair of curved surfaces 4 and 5 of the profile piece and the pair of curved surfaces 8 and 9 of the legs 7 of the joint piece, in order to assure that these parts will come to lie within each other in the correct jamming position.

In order to obtain a correct joint notwithstanding slight deviations of measurements, corner joint pieces may be used in one of the forms shown in FIGS. 2, 5, 6 and 8.

As shown, the corner joint piece 34 of FIG. 8 is split in its longitudinal direction so that it consists of two parts 35 and 36, each having one of the curved outer surfaces 8 and 9. The cleft 37 between the pieces 35 and 36 has an enlarged part 15 in each leg 7. Into this, a piece 16 of somewhat elastic material, such as neoprene, rubber or wood has been inserted. A similar result is achieved in FIG. 6 by a wedge 18 in a cleft 38 between two pieces 39 and 40. If wedges 18 are applied, holes 19 (see FIG. 2) are bored in the profile pieces 1, each lying in line with a continuation of a wedge 18. The wedge 18 may then be driven by the aid of a pin passed through a hole 19. This also results in the sloping planes 30, 31, of the profile piece being firmly pressed against each other. In order to retain the two parts of the corner joint piece and the pieces of elastic material or wedges lying in between together before the joint piece is positioned, pins 17 (FIG. 8) have been arranged lying transversely to the parts 35 and 36 of the legs 7 and press-fit therein, slightly jamming. This jamming is such that the above-mentioned parts of a loose corner joint piece do not fall apart, but it does not prevent these parts being urged toward each other when a leg is pressed into a profile piece.

The elastic material may vary in its properties. It may be compressible like wood but it may also be deformable like neoprene or rubber. When using a substance with the latter quality, it will be compressed when a leg of a joint piece is pressed in and it will bulge in the directions towards the broad surfaces 10 and 11 of the profile opening. When applying wood or the like, this bulging will not occur.

The piece of elastic material 16 or the wedge 18 placed between the parts of a joint piece may have any of various shapes. Its cross section may be cylindrical as shown in FIG. 5 or rectangular as shown in FIG. 6. In an annular cross section, the diameter may be equal to the distance between the two broad surfaces 10 and 11 of the longitudinal aperture 3 in the profile piece. The tangents of this cylinder to the surfaces 10 and 11 then have the same function as the ribs 14 shown in FIG. 4. In the case of a rectangular cross section, longitudinal ribs may be present on the inserted piece 16 or 18 which lie against the surfaces 10 and 11 of the longitudinal aperture in the profile piece. It is also possible, in place of the enlarged parts 15 of the cleft 37, to place in the cleft 37 between the smooth surfaces of the leg-parts facing each other, a flat strip of elastic material or a wedge, which part, if so desired, may protrude from the broad surfaces 12 and 13 of the leg 7 and lie against the broad surfaces 10 and 11 of the longitudinal aperture in the profile piece.

FIGS. 9 and 10 show another form of a corner joint piece 41, in which each leg 7 is narrower than the length of the aperture in the profile piece, i.e., narrower than the distance between the cylindrical surfaces 4 and 5. Alongside either leg of the corner joint piece lies a wedge 20. For driving the said wedges, holes are provided in the profile pieces to be connected, the holes lying in the direction representing a continuation of the wedges 20; for example the holes may run in the same direction as the holes 19 in FIG. 2. The wedges 20 each have a cylindrical surface 8 and the corner joint piece has also cylindrical surfaces 9, which surfaces correspond completely with the surfaces 8 and 9 shown in FIGS. 3, 4, 5, and 6 and which lie against the cylindrical surfaces 4 and 5 of the aperture in the profile piece. The contact surfaces 21 between the corner joint piece 7 and the wedges 20 make a small angle with the longitudinal direction of the corner legs.

The legs of a corner joint piece need not always be at an angle of 90° as shown in the drawings so far described. Other angles may be necessary, e.g. if a hexagonal frame must be constructed. It is not even necessary for the legs of a joint piece to be fixedly connected with each other under a predetermined angle. They may also be connected to each other hingedly. With such a corner piece the profile pieces may be connected under any angle whatever, and the size of the angle is determined by the angles along which the ends of the profile pieces to be connected are obliquely sawn off. Such a hinge bolt may be situated parallel to the legs of the angle piece 7; i.e., from the cylindrical surface 8 to the cylindrical surface 9 facing the surface 8.

Another form of a corner joint piece with a hinge bolt is shown in FIG. 11. Here, the legs of the cornerpiece lie in the same plane surface. This means that the longitudinal apertures in the profile pieces conform by being made at 90° with respect to those shown in FIGS. 3–6. The angle piece shown in FIG. 11 may be fixed, but this form is particularly adapted for the arrangement of a hinge bolt 22. At the hinge, the legs of the corner piece have been cut off for more than half their thickness and the remaining thin parts are lying one upon the other and are connected by the hinge bolt 22. Moreover, the corner joint piece may be executed in one of the already described ways, e.g. with wedges.

A disadvantage of the use of wedges may be that an assembled frame cannot readily be taken apart if it appears to have been incorrectly mounted. For driving out a wedge, a rod would have to be put into a profile rod and then it would have to be put against the wedge, whereupon the wedge could be loosened by strokes. It is, however, not possible to insert such a rod into the longitudinal opening of a profile rod which is closed at both ends by a corner joint piece. In order to enable disassembly, a conical pin 23 with screw thread 24, as indicated in FIG. 12, may be used instead of a wedge. This pin is provided at its thickest end with a groove 25 for a screw driver or with an angular aperture into which a fitting rod can be inserted to rotate the pin. This pin could be at the place of the part 16 in FIG. 5. In the two parts of the corner joint piece a corresponding conical screw thread is provided. These special forms can easily be obtained by making the parts of the corner joint piece and the conical pin (FIG. 12) by injection moulding or casting under pressure.

An especially favourable cross section of the profile rods to be jointed is shown in FIG. 13. This cross section looks much like the profile shown in FIGS. 3–6, with the difference that one of the broad walls delimiting the longitudinal aperture is missing. The cylindrical walls 4 and 5 are, however, present. The profile piece has, however, two longitudinal ribs 26, each having a hook-shaped end 27. Over these longitudinal ribs 26 at each end of the profile piece a small piece of plate 28 has been slid, which plate has hook-shaped edges 29 fitting in the hooks 27 of the longitudinal ribs 26. The length of the piece of plate 28 is slightly greater than the length of a leg of a corner joint piece 7. This is sufficient, for the plate 28 serves for guiding a leg of a corner joint piece when it is inserted and for preventing the bending out of the profile rod as a consequence of the pressure exerted by the corner joint piece on the cylindrical surfaces 4 and 5 when the wedge is tightened.

The structure shown in FIG. 13 has many advantages. In the first place it means an economy in material because, except at its ends the profile rod has one wall less. In the second place it is much easier to make a profile rod by extrusion when the rod has no longitudinal aperture. In the third place this rod section makes is possible to loosen a tightened wedge from a completely assembled frame. For the profile rods are then not closed along the greatest part of their length by plates 28 and, therefore, in such an open part a rod may be inserted and placed against the thin end of a wedge to be removed, and then the wedge may be loosened by hammer strokes on the said rod. To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A building structure, including in combination two profile pieces, each having a generally rectangular longitudinal aperture, each said aperture having first and second facing surfaces which are arcs of the same cylinder and joined by third and fourth facing surfaces which cross said cylinder, and a corner joint piece having two legs, each jammed into a said longitudinal aperture of one said profile piece and having first and second surfaces that are arcs of the said cylinder and having third and fourth surfaces joining them and spaced from the third and fourth surfaces of said profile piece by a suitable clearance, whereby a said profile piece and a said leg inserted therein may be slightly rotated relative to each other to correct misalignment, the cylindrical surfaces that lie against each other than sliding along each other.

2. The structure of claim 1 wherein a rib extends from each of the third and fourth surfaces of the longitudinal aperture in each profile piece to the third and fourth surfaces of the leg therein of the corner joint piece, said rib being located midway of the width thereof, said rib forming part of one said piece and engaging the other said piece.

3. The structure of claim 2 wherein said ribs form part of said legs.

4. The structure of claim 1 wherein each said leg is split along its longitudinal direction to provide two longitudinally extending portions, each having one said cylindrical surface, and an elongated piece of elastic material inserted between these said portions and spacing them apart.

5. The structure of claim 1 wherein each said leg is split along its longitudinal direction to provide two longitudinally extending portions each with one said cylindrical surface, and a wedge positioned between each pair of said portions, and spacing them apart, each said profile piece having holes lying along a line of continuation of its associated said wedge, so that each said wedge may be driven with the aid of a pin which is temporarily passed through said hole.

6. The structure of claim 5 wherein the wedge for urging apart the portions of said legs is a conical pin with a screw thread, a corresponding screw thread being provided in the leg-parts.

7. The structure of claim 1 wherein each said leg is split along a generally longitudinal direction into two longitudinally extending parts meeting at a surface making a small angle with the longitudinal direction of a leg, each said part having a wedge shape and each wedge-shaped said part having a said cylindrical surface, said profile pieces having holes, said holes lying in the continuation of at least one said wedge-shaped part of each said leg to enable the driving of said wedge-shaped pieces.

8. The structure of claim 1 wherein the legs of said corner joint piece are joined together by a hinge bolt.

9. The structure of claim 1 wherein each said profile piece comprises a first member having said first, second, and third surfaces and a second member providing said fourth surface, said first member having a pair of uninterrupted hook-shaped longitudinal ribs, said second member having a pair of hook-shaped edges which hook behind said hook-shaped ribs so that said two members can be slid together to form said profile piece.

10. The structure of claim 1 wherein said first and second surfaces of each said leg include arcuate grooves for retaining glue, and wherein said structure includes glue for lubricating said surfaces during assembly and for subsequently holding them together tightly.

11. A corner joint for use in a building structure with profile pieces having a generally rectangular longitudinal aperture with first and second facing surfaces which are arcs of the same cylinder and are joined by third and fourth facing surfaces which cross said cylinder, said corner joint piece comprising two legs, each adapted to be jammed into a said longitudinal aperture of one said profile piece and having first and second surfaces that are arcs of the said cylinder and having third and fourth surfaces joining them and spaced from the third and fourth surfaces of said profile piece by a suitable clearance, each said leg being split along its longitudinal direction to provide two longitudinally extending portions each with one said cylindrical surface, and a wedge positioned between each pair of said portions, and spacing them apart.

12. The structure of claim 11 wherein said first and second surfaces of each said leg include arcuate grooves for retaining glue, and wherein said structure includes glue for lubricating said surfaces during assembly and for subsequently holding them together tightly.

13. A building structure, including in combination two profile pieces, each comprising a first member having first and second facing surfaces and a third surface joining said first and second faces, and a second member providing a fourth surface, said first member having a pair of uninterrupted hook-shaped longitudinal ribs, said second member having a pair of hook-shaped edges which hook behind said hook-shaped ribs so that said two members can be slid together to form said profile piece having a generally rectangular longitudinal aperture, said first and second surfaces being arcs of the same cylinder facing across said aperture, and a corner joint piece having two legs, each jammed into a said longitudinal aperture of one said profile piece and having first and second surfaces that are arcs of the said cylinder and having third and fourth surfaces joining them and spaced from the third and fourth surfaces of said profile piece by a suitable clearance.

14. The structure of claim 13 wherein said first and second surfaces of each said leg include arcuate grooves for retaining glue, and wherein said structure includes glue for lubricating said surfaces during assembly and for subsequently holding them together tightly.

15. A building structure, including in combination two profile pieces, each having a generally rectangular longitudinal aperture, each said aperture having first and second facing surfaces which are arcs of the same cylinder and joined by third and fourth facing surfaces which cross said cylinder, and a corner joint piece having two legs, each jammed into a said longitudinal aperture of one said profile piece and having first and second surfaces that are arcs of the said cylinder and having third and fourth surfaces joining them and spaced from the third and fourth surfaces of said leg by a suitable clearance, each said leg having as an integral portion thereof a rib extending from each of the third and fourth surfaces of said leg to the third and fourth surfaces of said apertures.

References Cited by the Examiner

UNITED STATES PATENTS

| 961,992 | 6/1910 | Underwood | 287—20.92 |
|---|---|---|---|
| 2,804,952 | 9/1957 | Nothdurft | 287—189.36 |
| 2,918,153 | 12/1959 | Hammitt et al. | 287—189.36 |
| 3,087,768 | 4/1963 | Anderson et al. | 287—189.36 |
| 3,202,245 | 8/1965 | Le Tarte | 287—189.36 |
| 3,253,847 | 5/1966 | Webster | 287—189.36 |
| 3,284,113 | 11/1966 | Howell | 287—20.92 |

FOREIGN PATENTS

| 835,347 | 3/1952 | Germany. |
|---|---|---|
| 1,001,811 | 1/1957 | Germany. |
| 983,471 | 2/1965 | Great Britain. |
| 284,017 | 7/1952 | Switzerland. |
| 352,125 | 3/1961 | Switzerland. |

CARL W. TOMLIN, *Primary Examiner.*

MARION PARSON, JR., *Examiner.*